US005703302A

United States Patent [19]

Hasler et al.

[11] Patent Number: 5,703,302

[45] Date of Patent: Dec. 30, 1997

[54] DEVICE FOR TESTING THE HOLDING FORCE OF FASTENER ELEMENTS SECURED IN A BASE MATERIAL

[75] Inventors: Roland Hasler, Vaduz; Stefan Miescher, Eschen, both of Liechtenstein

[73] Assignee: Hilti Aktiengesellschaft, Schaan, Liechtenstein

[21] Appl. No.: 794,357

[22] Filed: Feb. 4, 1997

[30] Foreign Application Priority Data

Feb. 6, 1996 [DE] Germany ........................ 196 04 158.9

[51] Int. Cl.[6] ........................ G01D 1/00

[52] U.S. Cl. ........................ 73/865.8; 73/826; 73/827

[58] Field of Search ........................ 73/826, 827, 828, 73/831, 832, 833, 865.8; 248/354.5, 354.6, 353; 292/95, 101, 109, 256, 295, 129

[56] References Cited

U.S. PATENT DOCUMENTS

| | | | |
|---|---|---|---|
| 2,447,992 | 8/1948 | Turek | 248/353 |
| 2,560,109 | 6/1951 | Hines | 248/353 |
| 3,224,722 | 12/1965 | Flick | 248/353 |
| 4,717,107 | 1/1988 | Servadio | 248/353 |
| 5,583,288 | 12/1996 | Brenner et al. | 73/132 |

FOREIGN PATENT DOCUMENTS

| | | | |
|---|---|---|---|
| 599533 | 5/1978 | Switzerland | 73/865.8 |

*Primary Examiner*—Elizabeth L. Dougherty
*Assistant Examiner*—Ronald L. Biegel
*Attorney, Agent, or Firm*—Anderson Kill & Olick, P.C.

[57] ABSTRACT

A device for testing the holding force of fastening elements secured in a base material includes an axially extending load application member (5) engageable within an axially extending impact member so that the impact member can be displaceable axially relative to the load application member. The load application member (1) has a coupling region (3) at a front end and a stop surface (4) spaced axially from the coupling region and facing towards the first end of the load application member. The impact member (2) has a central passageway in which at least part of the load application member is displaceable. The impact member (2) has a first stop surface (6) facing a second end of the impact member (2). The coupling region is substantially cylindrically shaped and has projections (14) which extend radially outwardly from the outside surface of the coupling region. The projections (14) can be deflected elastically.

11 Claims, 1 Drawing Sheet

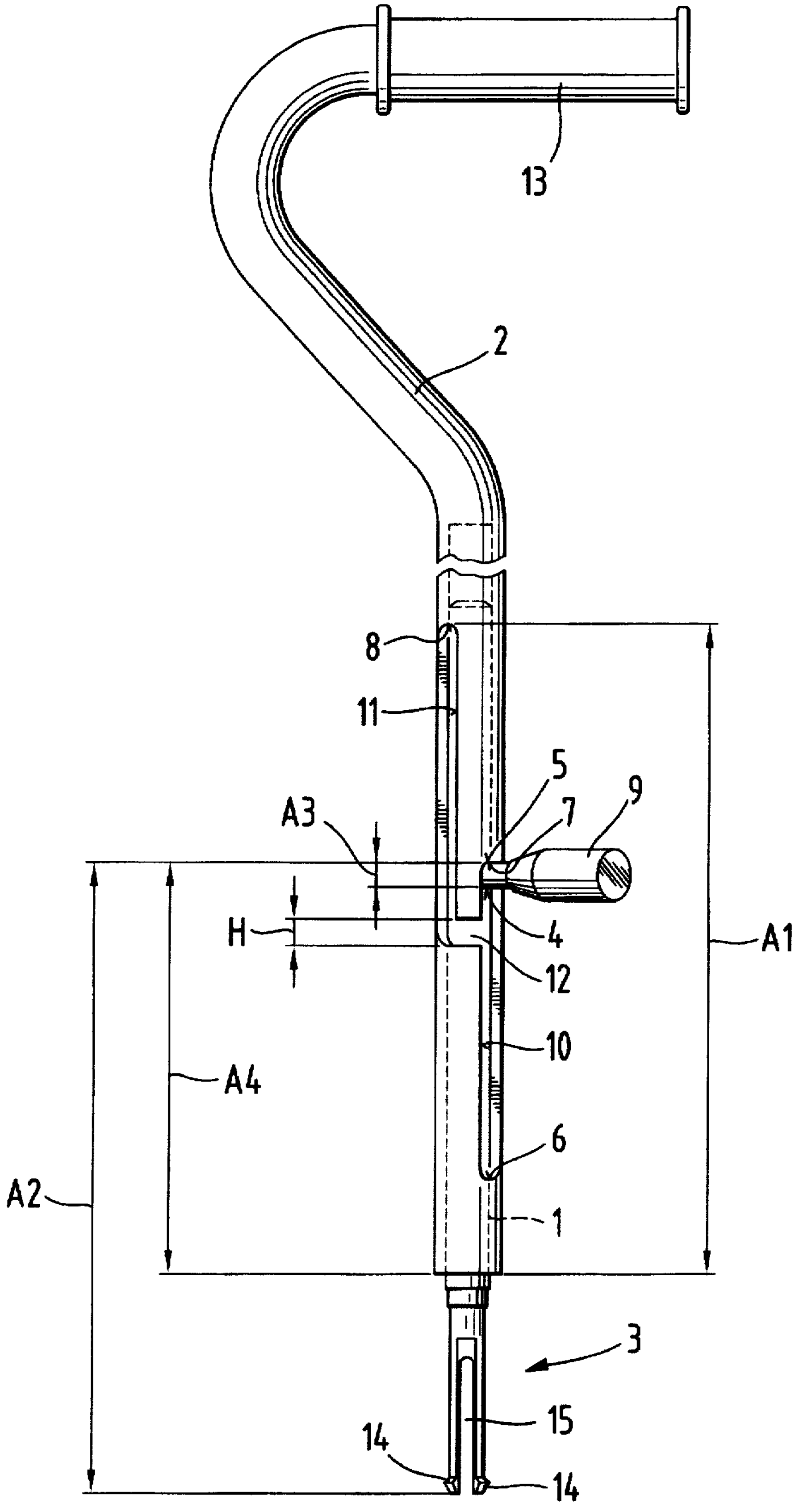
13
2
8
11
5
9
7
A3
4
H
12
10
A4
A1
6
A2
1
3
15
14
14

DEVICE FOR TESTING THE HOLDING FORCE OF FASTENER ELEMENTS SECURED IN A BASE MATERIAL

BACKGROUND OF THE INVENTION

The invention is directed to a device for testing the holding force of fastener elements secured in a base material and includes a load application member with a first end and a second end and an impact member which can be displaced axially relative to the load application member. The impact member has a central passageway for guiding the load application member. At the first end, the load application member has a coupling region which can be connected to a bore in the fastening element. The load application member has a stop surface located between its first and second ends with the surface facing in the direction of the first end, and the impact member has a first stop surface interacting with the stop surface of the load application member.

For fastening insulating materials to ceilings, floors and particularly to roofs, fastening elements are used which can be fixed into a base material.

As an example, German Utility Patent 85 34 738 discloses fastening elements which can be secured in a base material using a setting tool. Such fastening elements have a large surface area head and a hollow shaft extending axially from the head along with a nail-shaped element. The nail-shaped element is located in the interior of the hollow shaft and can be driven for securing it into a base material. The hollow shaft is accessible from outside the region of the large surface area head.

When fastening elements are set, it is possible that there may be setting failures occurring for a variety of reasons. For example, the nail-shaped element may be deflected if the base material is concrete and the element strikes reinforcing steel or, especially when the fastening element is driven into a large area roof with spaced steel girders, the nail-shaped element may be driven or offset from the steel girder. In such a case, the fastening element is not secured to the girder, but rather is held only by the friction existing between the shank of the fastening element and the insulating material into which it is driven.

The operator performing the driving operation cannot recognize such a setting failure. Accordingly, it is necessary to test each point where a fastening element is driven to check the holding force of each fastening element.

The German Offenlegungsschrift 38 41 883 discloses a device for setting and pulling out a fastening element in the form of a dowel which can be fixed in a base material. The device includes an impact member having a central passageway and a load application member extending through the passageway of the impact member. At a first end, the load application member has a coupling region with an external thread capable of being screwed into the dowel. A second end of the load application member, spaced from the first end, is provided with a circumferential radial enlargement forming a stop shoulder facing toward the first end.

The impact member can be displaced axially relative to the load application member between the coupling region and, the radial enlargement of the load application member. An impact region cooperating with the impact shoulder of the load application member, is formed by the front of the impact member facing a second end of the load application member.

When securing insulating material, it is not always evident from the outside whether the fastening element is held with sufficient force in the base material. A conclusive answer can be obtained only by tests involving an attempted withdrawal of the fastening element from the base material by suitable equipment. Since the number of points where the insulating material is secured to the base material is large, the device disclosed in the German Offenlegungsschrift 38 41 883 is not suitable because of the external thread in the coupling region. On one hand, it is necessary to provide such fastening elements, which exist as bulk goods, with a counterthread and, on the other hand, the connection between the coupling region and the fastening element by means of a thread is time consuming.

SUMMARY OF THE INVENTION

Therefore, it is the primary object of the present invention to provide a device for testing the holding force of a fastening element where the device can be used simply and reliably and does not damage the fastening element. Moreover, it is possible to connect and release the device quickly and in a simple manner to and from the fastening element to be checked.

In accordance with the present invention, the coupling region of the device is formed substantially cylindrically and has at least one projection which can be deflected elastically and protrudes radially outwardly from the outside surface of the coupling region.

By means of the substantially cylindrically shaped coupling region and the projection, which can be deflected elastically and extends radially outwardly from the outside surface of the coupling region, it is possible to connect the load application member of the device rapidly and simply to a fastening element. If, for example, the coupling region is introduced into a hollow borehole, the coupling region is put under tension by radial compression. At the same time, the projections which can be deflected elastically and extend radially outwardly from the outside surface, press against an inside surface of the hollow bore or passageway in the fastening element, so that friction develops when the innerwall is smooth or a positive lock is effected when the innerwall has a stepped profile.

During the movement of the impact member towards the second end of the load application member, the first stop surface on the impact member, facing the second end of the impact element, strikes against the stop surface of the load application member. As a result, a force is developed which pulls the fastening element, if it has not been set correctly, from the base material. If the holding force of the fastening element is strong enough, the coupling region separates from the fastening element. Preferably, at least one projection is formed in a saw-tooth fashion with a flank facing the free end forming a smaller angle with the axis of the coupling region. The saw-tooth shaped projections can provide a positive lock, for example, with stop edges disposed in the fastening element bore or passageway.

To assure that the coupling region can be inserted satisfactorily into a fastening element passageway, preferably, at least one projection is formed to be radially elastic. Such radial elasticity of the coupling region is attained by providing the coupling region with a slot opened at the first end of the load application member and, further, with diametrically arranged projections located on opposite sides of the slot.

To facilitate introduction of the coupling region into the hollow shaft of a fastening element, the width of the slot preferably corresponds at least to the sum of the radial extensions of the projections.

For example, in the case of a compact construction of the device, the load application member is fitted in a central borehole or passageway of the impact member and extends at least partially outwardly from a first end of the impact member. For transferring the tensile force, generated by the impact element, to the load application member, the stop surface on the load application member is desirably formed by a stop extending radially outwardly from the outer surface of the load application member and the first stop surface on the impact member is preferably formed by a radially extending opening through the impact member extending outwardly from the central borehole or passageway to the outer surface of the impact member.

Preferably, the radial opening is in the form of a first axially extending slot extending parallel to the axial direction of the impact member and has a second stop surface located at a distance from the first stop surface and facing the first stop surface. Accordingly, compressive forces as well as tensile forces can be transferred from the impact member to the load application member by the device embodying the present invention.

So that the coupling region of the load application member extends outwardly from the first end of the impact member when the stop of the load application member is in contact with the second stop surface, the distance between the second stop surface of the impact member and the first end of the impact member facing the coupling region amounts essentially to the distance between a stop surface of the stop facing away from the coupling region and the first end of the load application member reduced by the axial extent of the coupling region.

If, for example, a fastening element has not been set correctly, it is pulled outwardly from the base material during the testing of the device embodying the present invention. To remove the fastening element from the coupling region, however, the load application member must be axially offset with respect to the impact member to such an extent that the coupling region does not project axially from the first end of the impact member. Accordingly, the impact member has a third stop surface offset in the circumferential direction relative to the second stop surface and faces the stop region with the distance between the second stop surface and the first end of the impact member corresponding at most to the distance between the stop shoulder of the stop spaced from the coupling region and the first end of the load application member.

So that the coupling region or the load application member can be shifted reliably relative to the impact member in the direction of the second end of the impact element, the stop is preferably formed as a radially extending handle projecting outwardly from the outside surface of the impact member.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

The drawing is an elevational view of a device embodying the present invention.

DETAILED DESCRIPTION OF THE INVENTION

The device of the present invention serves for testing the holding force of fastening elements, not shown, fixed in a base material, not shown.

The device includes an axially extending load application member 1 having a first end, the lower end as viewed in the drawing, and a second end, the upper end as shown in the drawing. The device also includes an axially extending tubular impact member 2 which can be displaced axially relative to the load application member and has a first end, the lower end is viewed in the drawing, and a second end, the upper end as viewed in the drawing. The impact member 2 has a central bore or passageway extending in the axial direction from the first end towards the second end. The load application member is axially displaceable within the central passageway. An axially extending coupling region 3 extends from the first end of the load application member 1 and can be engageable within a bore of a fastening element. The axially extending coupling region 3 is substantially cylindrical and has projections 14 at the first end of the load application member. The projections 14 extend radially outwardly from the outside surface of the coupling region and can be deflected elastically. The projections 14 have a saw-tooth like configuration in the axial direction with a first flank facing the first end of the load application member having a smaller angle relative to the axis of the coupling region 3 than the other flank, facing in the opposite direction. A slot 15 is formed in the coupling region 3 open at the first end and extending towards the second end of the load application member. The projections 14 are arranged diametrically opposite one another on opposite sides of the slot 15. The slot 15 affords elastical deflectability for the coupling region 3.

The load application member 1 has a stop surface 4 spaced axially from the coupling region 3 and facing the first end of the load application member. The stop surface 4 interacts with a first stop surface 6 on the impact member 2, when a tensile force is transferred by the impact member 2 to the load application member 1. If the fastening element being tested has not been properly secured in the base material, the tensile force pulls the fastening element out of the base material.

The stop surface 4 on the load application member 1 is formed by a stop 9 shaped as a side handle. The side handle 9 extends radially outwardly from the load application member 1 and passes through a first axially extending slot 10 in the impact member 2 arranged parallel to the axial direction of the impact member. The impact member 2 has a first end adjacent the coupling region 3 of the load application member 1.

The end of the axially extending slot 10, closer to the first end of the impact member 2 forms the first stop surface 6 of the impact member.

A second stop surface 7, facing toward the first end of the impact member, is formed by the end region of the axially extending slot 10 and is spaced more remotely from the first end of the impact member than the first stop surface 6.

A distance A4 extends in the axial direction between the second stop surface 7 and the first end of the impact member facing the coupling region 3 and corresponds essentially to the axial dimension A2 between a stop shoulder 5 on the stop or handle 9, spaced from the coupling region 3 and a first end of the load application member 1 less the axial dimension of the coupling region 3.

Parallel to the first axially extending slot 10 is a second axially extending slot 11 offset in the circumferential direction from the first slot 10 and having a third stop surface 8 facing the first end of the impact member.

The dimension A1 between the third stop surface 8 and the first end of the impact member 2 corresponds at most to the dimension A2 between the stop shoulder 5 of the stop 9 spaced from the coupling region 3, and the first end of the load application member 1.

First axially extending slot 10 is connected with the second axially extending slot 11 via a connecting channel 12 extending essentially at right angles to the axial direction of the impact member 2. The connecting channel 12 has a height H extending parallel to the axial direction of the impact element 2, approximately equal to the dimension A3 between the stop surface 4 and the stop shoulder 5 on the stop 9 facing the second end of the load application member. As indicated above, the stop 9 is formed as a side handle.

The second end of the impact member 2, at the opposite end thereof from the coupling region 3, is in the shape of a bent handle 13 with the handle extending substantially perpendicularly to the axial direction of the load application member.

What is claimed is:

1. A device for testing the holding force of fastening elements having an axially extending bore therein and secured in a base material, comprises an axially extending load application member (1) having a first end and a second end spaced axially apart and an axially extending impact member (2), said impact member being axially displaceable relative to said load application member (1), said impact member (2) having a first end and a second end spaced axially apart and a central passageway arranged to receive and guide said load application member, said load application member (1) having an axially extending coupling region (3) extending from the first end thereof towards the second end thereto, said coupling region (3) being engageable in the bore of a fastening element to be tested, said load application member (1) having a stop surface (4) thereon spaced between said first and second ends thereof and facing towards said first end thereof, said impact member (2) having a first stop surface (6) facing away from the first end thereof and arranged to interact with said stop surface (4) on said load application member, said coupling region (3) having a substantially cylindrical outside surface, said outside surface of the coupling region (3) having at least one projection (14) extending radially outwardly therefrom, and said projection (14) being elastically deflectable.

2. A device, as set forth in claim 1, wherein said at least one projection (14) having a saw-tooth like shape with a first flank facing the first end of said load application member and forming a smaller angle with the axis of said load application member than a second flank facing away from the first end.

3. A device, as set forth in claim 1 or 2, wherein said coupling region (3) has an axially extending slot (15) open at the first end of the said load application member and two said projections (14) located diametrically opposite one another on opposite sides of said slot (15).

4. A device, as set forth in claim 3, wherein said slot (15) has a dimension extending transversely of the axial direction of the said load application corresponding at least to sum of the radial outward dimensions of said projections (14) extending outwardly from the outside surface of the said coupling region.

5. A device, as set forth in claim 1 or 2, wherein said stop surface (4) of said load application member (1) is formed by a stop (9) projecting radially outwardly from an outside surface of said load application member (1), and said first stop surface (6) on said impact member (2) is formed by a radial opening in said impact member (2) and said radial opening extends from the central passageway therein to an outside surface of said impact member (2).

6. A device, as set forth in claim 5, wherein said radial opening in said impact member (2) comprises an axially extending slot (10) extending parallel to the axial direction of the said impact member (2) and having a second stop surface (7) spaced axially from said first stop surface (6) located closer to the second end of the said impact member and facing towards said first stop surface (6).

7. A device, as set forth in claim 6, wherein a dimension (A4) between said second stop surface (7) and the first end of said impact member (2) corresponds essentially to a dimension (A2) between a stop shoulder (5) on said stop (9) spaced axially from said coupling region (3) and the first end of said load application member (1) less the axial extent of said coupling region (3).

8. A device, as set forth in claim 7, wherein said impact member (2) has a third stop surface (8) offset from said second stop surface (7) in the circumferential direction and facing toward said first stop surface (6), a dimension (A1) between said third stop surface (8) and the first end of the said impact (2) corresponding with at most the dimension (A2) between the stop shoulder (5) of said stop (9) spaced from said coupling region (3) and the first end of said load application member.

9. A device, as set forth in claim 8, wherein said stop (9) is formed as a side handle extending radially outwardly from the outside surface of said impact member (2).

10. A device, as set forth in claim 9, wherein said third stop surface (8) forms an end of a second passageway (11) offset circumferentially from said first passageway (10) and spaced more remotely from said first end of said impact member (2) than said second stop surface (7), and a transverse channel (12) interconnecting said first passageway (10) and said second passageway (11).

11. A device, as set forth in claim 10, wherein said second end of the said impact member (2) is bent from the axial direction of the said impact and extends transversely of the said axial direction.

* * * * *